US012633578B2

(12) United States Patent (10) Patent No.: US 12,633,578 B2
Shafie et al. (45) **Date of Patent: \*May 19, 2026**

(54) BUS BAR ASSEMBLY HAVING A TEMPERATURE SENSING INTERFACE, BATTERY MODULE INCLUDING THE BUS BAR ASSEMBLY, AND METHOD OF MANUFACTURING THE BATTERY MODULE

(71) Applicant: CPS Technology Holdings LLC, New York, NY (US)

(72) Inventors: Abed Al Fattah Isam Shafie, Glendale, WI (US); Fredrick C. Ellner, Bayside, WI (US); Michael R. Blemberg, Shorewood, WI (US)

(73) Assignee: CPS Technology Holdings LLC, New York, NY (US)

( * ) Notice: Subject to any disclaimer, the term of this patent is extended or adjusted under 35 U.S.C. 154(b) by 804 days.

This patent is subject to a terminal disclaimer.

(21) Appl. No.: 17/608,569

(22) PCT Filed: Apr. 29, 2020

(86) PCT No.: PCT/US2020/030466
§ 371 (c)(1),
(2) Date: Nov. 3, 2021

(87) PCT Pub. No.: WO2020/226965
PCT Pub. Date: Nov. 12, 2020

(65) Prior Publication Data
US 2022/0238926 A1    Jul. 28, 2022

Related U.S. Application Data

(60) Provisional application No. 62/842,960, filed on May 3, 2019.

(51) Int. Cl.
*H01M 10/42* (2006.01)
*H01M 50/204* (2021.01)
(Continued)

(52) U.S. Cl.
CPC ....... *H01M 10/425* (2013.01); *H01M 50/204* (2021.01); *H01M 50/209* (2021.01);
(Continued)

(58) Field of Classification Search
CPC ............... H01M 10/425; H01M 10/42; H01M 10/4257; H01M 10/486; H01M 50/204;
(Continued)

(56) References Cited

U.S. PATENT DOCUMENTS

2010/0062329 A1    3/2010  Muis
2011/0024205 A1*   2/2011  Nishihara ............. H01M 10/48
                                                    429/90
(Continued)

FOREIGN PATENT DOCUMENTS

CN        102160213 A     8/2011
CN        102197509 A     9/2011
(Continued)

OTHER PUBLICATIONS

International Search Report and Written Opinion for PCT/US2020/030466, dated Aug. 19, 2020, 200 pages.

*Primary Examiner* — Adam J Francis
(74) *Attorney, Agent, or Firm* — Boardman & Clark LLP

(57) ABSTRACT

A bus bar assembly for a battery module having a plurality of electrochemical cells. The bus bar assembly comprising a bus bar carrier configured to receive bus bars to interface with terminals of the plurality of electrochemical cells, a flex circuit disposed on the bus bar carrier, and a temperature sensor welding tab comprising a circuit engagement region secured to the flex circuit and a welding region to be welded (Continued)

to an end of an electrochemical cell. Also disclosed is disclosed is a battery module including the bus bar assembly and a method of making the battery module.

20 Claims, 8 Drawing Sheets

(51) Int. Cl.

| | |
|---|---|
| *H01M 50/209* | (2021.01) |
| *H01M 50/507* | (2021.01) |
| *H01M 50/55* | (2021.01) |
| *H01M 50/569* | (2021.01) |

(52) U.S. Cl.
CPC ......... *H01M 50/507* (2021.01); *H01M 50/55* (2021.01); *H01M 50/569* (2021.01); *H01M 2200/10* (2013.01); *H01M 2220/20* (2013.01)

(58) Field of Classification Search
CPC .. H01M 50/209; H01M 50/507; H01M 50/55; H01M 50/569; H01M 50/516; H01M 50/519
See application file for complete search history.

(56) References Cited

U.S. PATENT DOCUMENTS

| | | | | |
|---|---|---|---|---|
| 2014/0329121 A1* | 11/2014 | Nishihara | ........... | H01M 10/482 429/90 |
| 2015/0069829 A1* | 3/2015 | Dulle | ........................ | B60L 1/02 307/9.1 |
| 2016/0380316 A1* | 12/2016 | Mack | .................. | H01M 50/209 429/93 |
| 2018/0190960 A1* | 7/2018 | Harris | ................... | H01M 50/20 |
| 2020/0274204 A1* | 8/2020 | Dawley | .............. | H01M 50/507 |
| 2022/0131202 A1 | 4/2022 | DeKeuster et al. | | |

FOREIGN PATENT DOCUMENTS

| | | |
|---|---|---|
| CN | 102544616 A | 7/2012 |
| CN | 105308770 A | 2/2016 |
| CN | 105518476 A | 4/2016 |
| CN | 206003858 U | 3/2017 |
| CN | 107004821 A | 8/2017 |
| CN | 108112274 A | 6/2018 |
| CN | 207781834 U | 8/2018 |
| EP | 2649701 A1 | 10/2013 |
| WO | 2018124494 A2 | 7/2018 |
| WO | 2018/220201 A2 | 12/2018 |
| WO | 2020/226965 | 12/2020 |

* cited by examiner

BUS BAR ASSEMBLY HAVING A TEMPERATURE SENSING INTERFACE, BATTERY MODULE INCLUDING THE BUS BAR ASSEMBLY, AND METHOD OF MANUFACTURING THE BATTERY MODULE

CROSS-REFERENCE TO RELATED APPLICATIONS

This application is a national phase entry of International Application PCT/US2020/030466; Filed April 29. 2020; which claims the benefit of U.S. Patent Application No. 62/842,960; filed on May 3, 2019; entitled "TEMPERURE SENSING INTERFACE"; the contents of which are incorporated herein by reference.

BACKGROUND

The present disclosure relates generally to the field of batteries and battery modules. More specifically, the present disclosure relates to temperature sensors and methods of integrating temperature sensors in batteries and battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional battery module configurations, temperature sensing components may be coupled to a processor of the traditional battery module, such that the processor receives or determines data indicative of a temperature of various portions of the traditional battery module. Unfortunately, integrating traditional temperature sensing components in traditional battery modules may be cumbersome and expensive, and may lead to undesirable affects, such as inaccurate temperature measurements. Accordingly, improved temperature sensors and integration features are desired.

SUMMARY

Disclosed herein is an apparatus which may address one or more deficiencies known above. A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, disclosed is a bus bar assembly for a battery module having a plurality of electrochemical cells. The bus bar assembly comprising a bus bar carrier configured to receive bus bars to interface with terminals of the plurality of electrochemical cells, a flex circuit disposed on the bus bar carrier, and a temperature sensor welding tab comprising a circuit engagement region secured to the flex circuit and a welding region to be welded to an end of an electrochemical cell.

In another embodiment, disclosed is a battery module. The battery module includes a housing, a plurality of electrochemical cells disposed in the housing, the plurality of electrical chemical cells including an electrochemical cell having a terminal end and a terminal of the terminal end, and the bus bar assembly, wherein the temperature sensor welding tab is welded to the terminal end of the electrochemical cell.

In yet another embodiment, disclosed is a method of making a battery module including a housing. The method includes placing a plurality of electrochemical cells in the housing, providing a bus bar assembly including a bus bar carrier and a flex circuit disposed on the bus bar carrier, soldering a circuit engagement region of a temperature sensor welding tab to a flexible extension of the flex circuit, placing the bus bar assembly adjacent to the plurality of electrochemical cells, flexing the flexible extension toward the electrochemical cells such that a temperature sensor of the flex circuit is in close proximity to a terminal end of an electrochemical cell of the plurality of electrochemical cells, and welding a welding region of the temperature sensor welding tab to the terminal end of the electrochemical cell.

These and other features and advantages of devices, systems, and methods according to this invention are described in, or are apparent from, the following detailed descriptions of various examples of embodiments.

BRIEF DESCRIPTION OF THE DRAWINGS

One or more examples of embodiments of the apparatus and methods according to this invention will be described in detail, with reference to the following figures, wherein.

Figure 1:
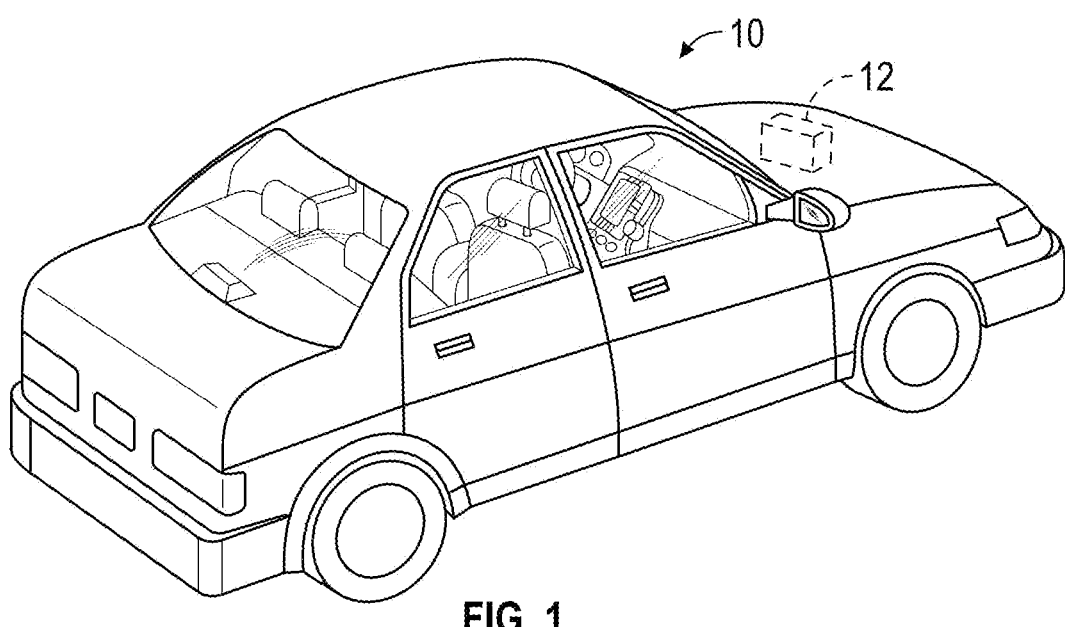
FIG. 1 is a perspective view of a vehicle having a battery module configured in accordance with present embodiments to provide power for various components of the vehicle.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of prismatic battery cells (e.g., lithium-ion (Li-ion) electrochemical cells) arranged to provide particular voltages and/or currents useful to power, for example, one or more components of an xEV.

Certain battery modules may include temperature sensing features that allow for temperature sensing of one battery cell, or a group of battery cells, within the module. Generally, the temperature sensors relay signals to a control module of the battery module to allow the control module to supervise temperature management of the battery cells. One challenge associated with temperature sensing of battery cells is providing a sufficient surface area of interface between a temperature sensor and a battery cell housing ("can"). Indeed, certain battery cell housing shapes present bigger challenges than others. For instance, flatter battery cells, such as pouch or prismatic battery cells, generally do not have excess surface area for the interface. Thus, sensing maximum cell temperature and reporting it to a battery management system is a challenge with the flat cell can interfaces. It is now recognized that a robust interface method is needed to pass environmental mechanical tests such as vibration and shock tests.

Certain of the configurations described herein use a flexible circuit as a voltage and temperature sensing component. In conventional techniques, for instance those associated with use of traditional wire harnesses, thermistors, a particular type of temperature sensor, are potted to a ring terminal that is either fastened or welded to cell terminals or cell cans. However, because flexible circuits use traces and not wire conductors, potting a copper trace is not feasible and would be mechanically weak.

One possible method would be to use a pressure sensitive adhesive (PSA) to attach a thermistor tab (which contacts a battery cell) to a flexible circuit. However, the PSA may provide an insufficient bond under certain temperature conditions (e.g., higher operating temperatures) due to small available surface contact when subjected to vibration and shock testing.

In one or more implementations, a mechanical joint is formed using solder to anchor the thermistor tab to the flexible circuit. The thermistor tab is designed to have a geometry that facilitates such an attachment. For instance, the thermistor tab geometry may be designed with two bends that each feed through two cutouts in the flexible circuit. The two cutouts are surrounded by conductive pads that are to be generated during the etching process of the flexible circuit. Before installing the thermistor tab, all the conductive pads are masked with solder paste in preparation for a reflow process, which is a particular type of solder process. When the flexible circuit assembly is reflowed, a mechanical joint (which is electrically isolated) is created between solder and the thermistor tab.

To help illustrate, FIG. 1 is a perspective view of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles;

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some constructions, positioning a battery system 12 under the hood of the vehicle 10 may enable an air duct to channel airflow over the battery system 12 and cool the battery system 12.

Figure 2:
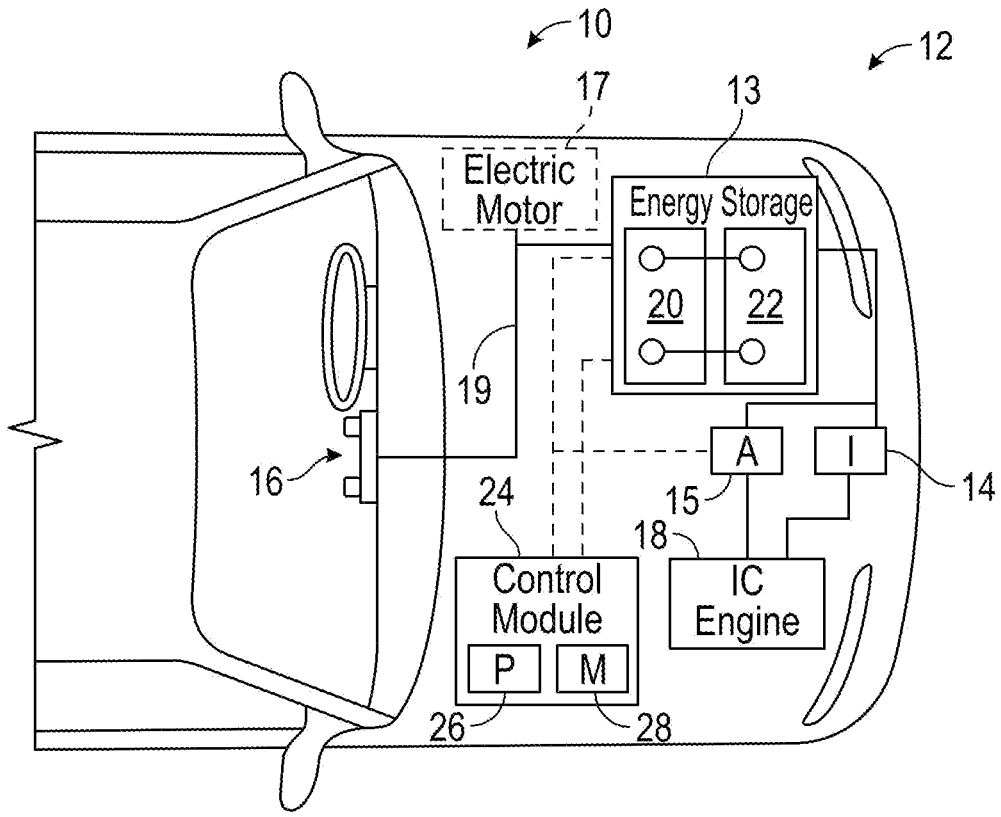
FIG. 2 is a cutaway schematic view of the vehicle and the battery module of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted construction, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some constructions, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some construction, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12-volt battery system 12 is used, the bus 19 may carry electrical power typically between 8-18 volts.

Additionally, as depicted, the energy storage component 13 may include multiple battery modules. For example, in the depicted construction, the energy storage component 13 includes a lithium ion (e.g., a first) battery module 20 and a lead-acid (e.g., a second) battery module 22, which each includes one or more battery cells. In other constructions, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some constructions, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate an amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some constructions, the control unit 24 may include portions of a vehicle control unit (VCU) and/or a separate battery control module.

Figure 3:
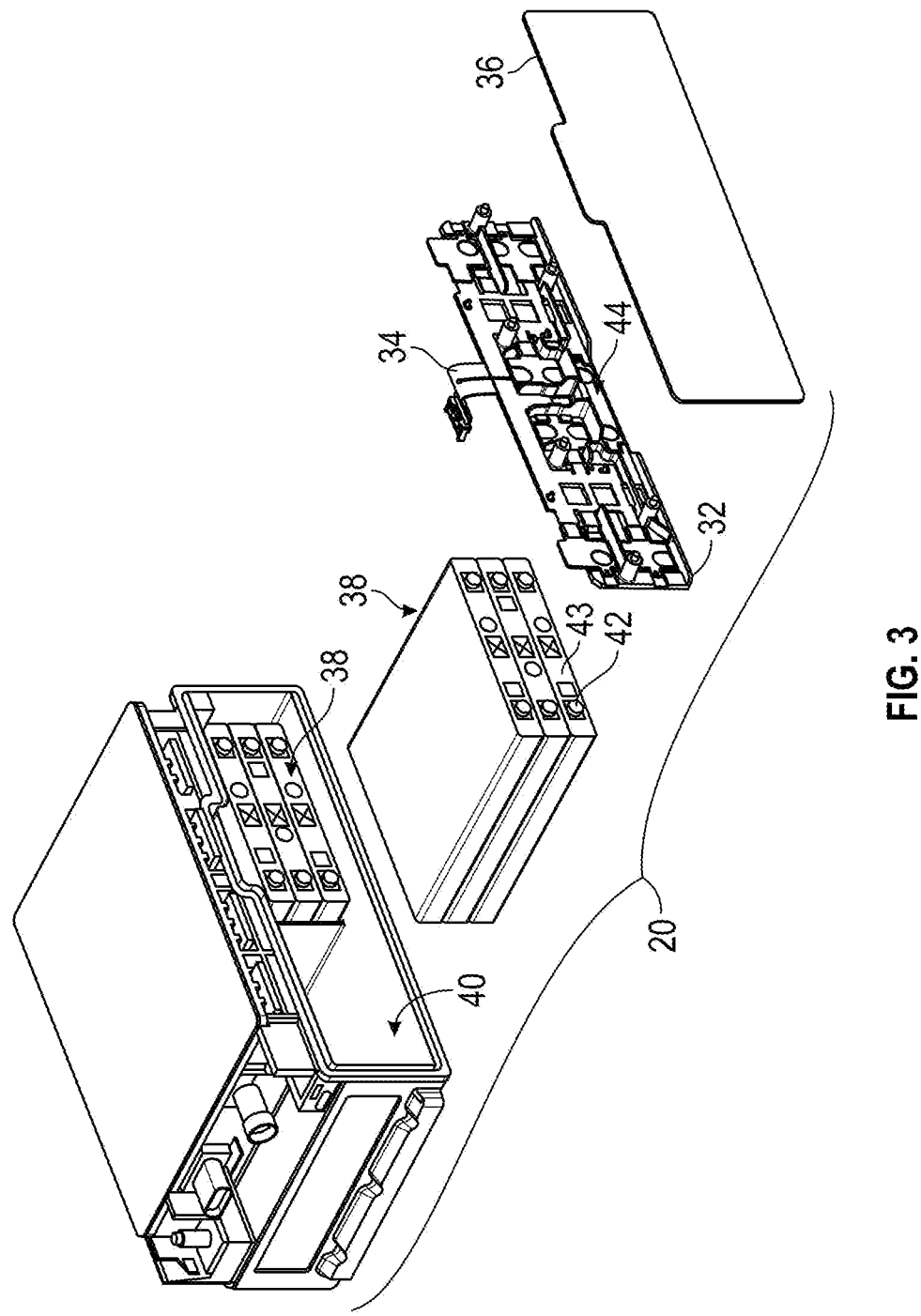
FIG. 3 is a partial exploded side view of a battery module capable of being used in the vehicle of FIG. 1.

FIG. 3 is a partial exploded, perspective view of a battery module 20 for use in the vehicle 10 of FIG. 1. Before proceeding, it should be noted that the battery module 20 may be used in other electrical environments and is not limited to the vehicle 10 of FIG. 1. For simplicity, not all components of the battery module 20 are illustrated. The battery module 20 (e.g., lithium-ion (Li-ion) battery module) includes a housing 30 (e.g., plastic housing), a bus bar carrier 32, a flex circuit 34, and a cover 36. A plurality of electrochemical cells 38 (e.g., Li-ion electrochemical cells), otherwise referred to as battery cells when enclosed by an individual battery cell housing, are disposed within the housing 30. In certain constructions, the battery module 20 may include any number of electrochemical cells 38 (e.g., 2, 3, 4, 5, 6, 7, 8, 9, 10, or more electrochemical cells), any type of electrochemical cell 38 (e.g., Li-ion, lithium polymer, lead-acid, nickel cadmium, or nickel metal hydride, prismatic, and/or cylindrical), and any arrangement of the electrochemical cells 38 (e.g., stacked, separated, or compartmentalized).

The housing 30 includes an opening 40 on one side (upper side or face) to receive the electrochemical cells 38. The bus bar carrier 32 may be disposed within the opening 40 and above the electrochemical cells 38, and may include bus bars disposed thereon configured to interface with terminals 42 extending from terminal ends 43 of the electrochemical cells 38. That is, the bus bars may be disposed in locations of the bus bar carrier 32 suitable for coupling the bus bars to the terminals 42 of the electrochemical cells 38. The bus bar carrier 32 may also include the flex circuit 34 disposed thereon. For example, the flex circuit 34 may be disposed on an upper side 44 of the bus bar carrier 32 opposing an underside 46 of the bus bar carrier 32. The flex circuit 34 in the illustrated construction is coupled to the upper side 44 of the bus bar carrier 32. The flex circuit 34 may include a flexible material, such as a polyimide material, within which (and from which) electrical components extend. The electrical components of the flex circuit 34 may be configured to interface with the bus bars and/or with the terminal ends 43 of the electrochemical cells 38. For example, as will be appreciated in view of further discussion below, the flex circuit 34 may include voltage sensing tabs configured to contact bus bars of the battery module 20, and temperature sensor welding tabs 49 (FIG. 4) configured to contact the terminal ends 43 of certain ones of the electrochemical cells 38. Each temperature sensor welding tab may include a metal material, such as aluminum, and may be configured to be welded (e.g., from overhead) to the terminal end 43 of one of the electrochemical cells 38. The flex circuit 34 may also include electrical contacts 50 extending toward other features disposed in the housing 40, such as a processor of the battery module 20 or an electrical path to the processor.

As set forth above and described in further detailed below, the voltage sensing tabs and the temperature sensor welding tabs 49 may be strategically positioned on the flex circuit 34, and the flex circuit 34 may be strategically positioned on the bus bar carrier 32, to enable coupling of the voltage sensing tabs and the temperature sensor welding tabs 49 of the flex circuit 34 with the appropriate features of the battery module 20. Aspects of the temperature sensor welding tabs 49 will be described in detail below with reference to later drawings.

Figure 4:
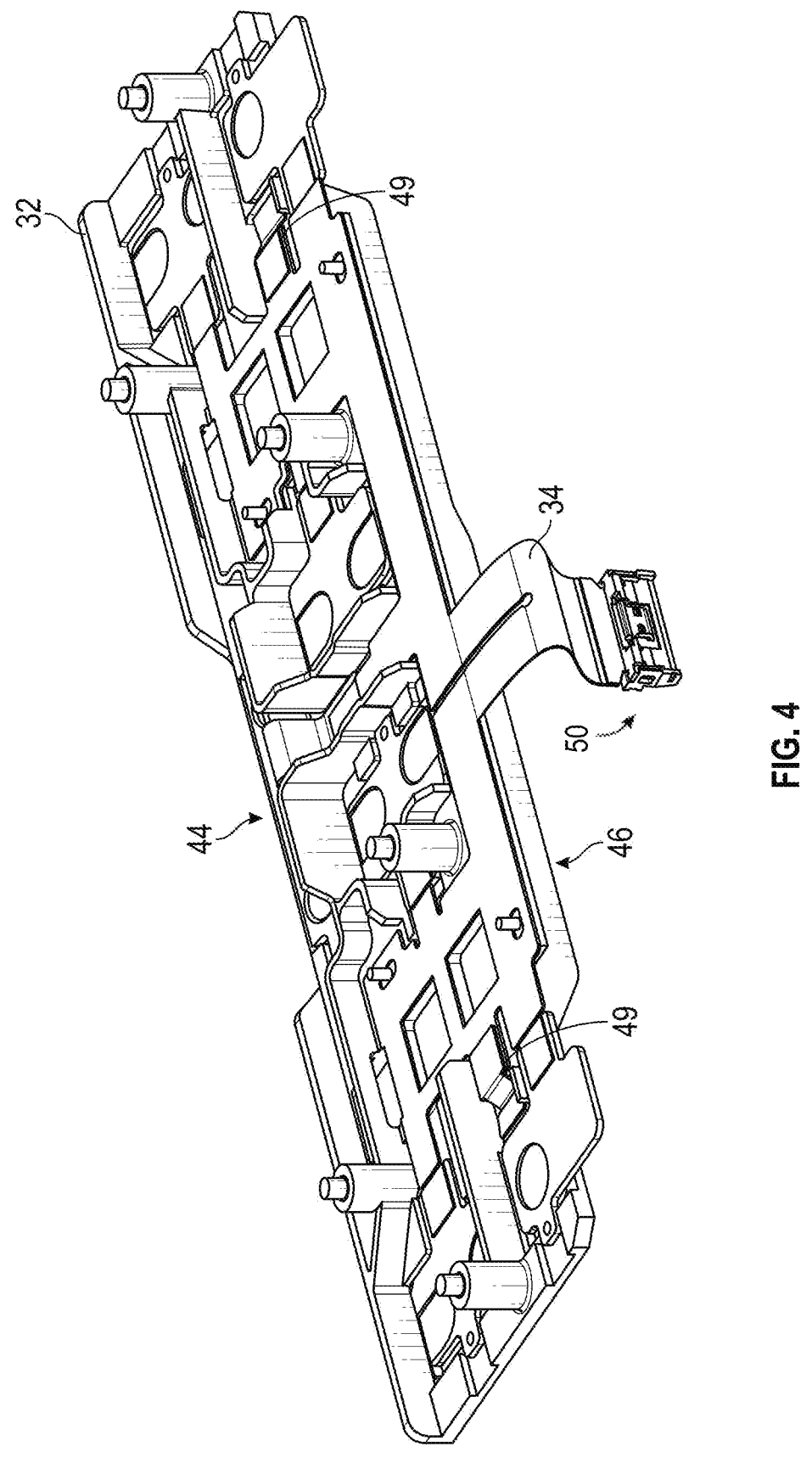
FIG. 4 is a perspective view of a bus bar carrier having a flex circuit, for use in the battery module of FIG. 3.

FIG. 4 is a perspective view of the bus bar carrier 32 having the flex circuit 34. As previously described, the flex circuit 34 may include a thin layer of flexible and electrically insulative material, such as polyimide. The flex circuit 34 may include various electrical components disposed in and/ or extending from the polyimide material of the flex circuit 34. For example, electrical conductors (e.g., traces) may be embedded within and/or printed on the polyimide material of the flex circuit 34, and may extend between various electrical components of the flex circuit 34. In the illustrated construction, the flex circuit 34 includes, for example, two temperature sensor welding tabs 49 extending from edges of the flex circuit 34, among other electrical components. In particular and as shown in further detail in FIGS. 8 and 9, the temperature sensor welding tabs 49 are securely fastened to the flex circuit 34 by way of at least one bond formed by reflow soldering.

Figure 5:
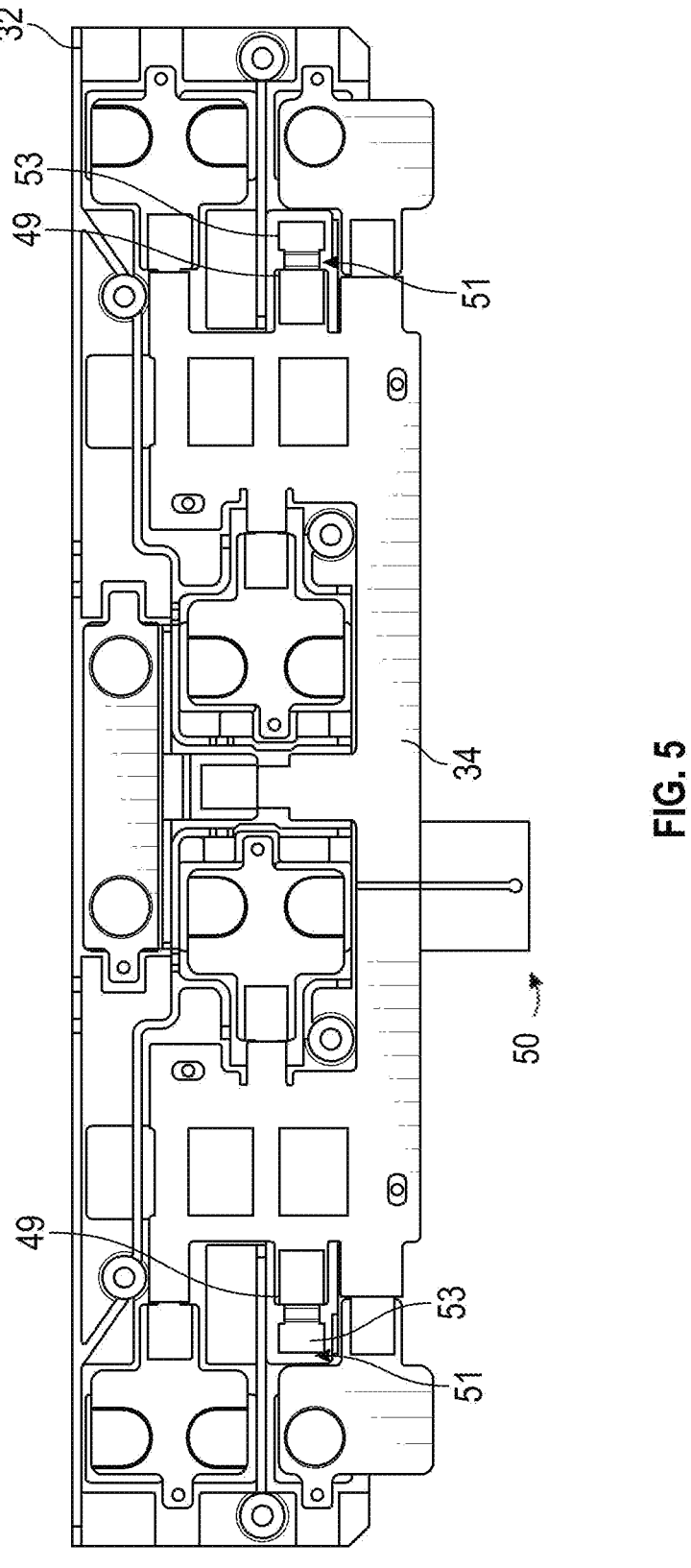
FIG. 5 is a top view of the bus bar carrier and flex circuit of FIG. 4.

Referring to FIGS. 4 and 5, the temperature sensor welding tabs 49 are disposed on portions of the flex circuit 34 that, when the flex circuit 34 is disposed on the bus bar carrier 32, cause the temperature sensor welding tabs 49 to extend through openings, or windows 51, in the bus bar carrier 32. The windows 51 may extend, for example, from the upper side 44 of the bus bar carrier 32 to the underside 46 of the bus bar carrier 32. That is, the windows 51 extend entirely through a thickness of the bus bar carrier 32. The windows 51 enable the temperature sensor welding tabs 49 to extend from the flex circuit 34 disposed on the upper side 44 of the bus bar carrier 32 into contact with features (e.g., terminal ends of electrochemical cells) disposed adjacent (e.g., under) the underside 46 of the bus bar carrier 32. The windows 51 also enable an unobstructed view of the temperature sensor welding tabs 49 from above the bus bar carrier 32. For example, FIG. 5 is a top view of the bus bar carrier 32 and the flex circuit 34 of FIG. 4. As shown, each temperature sensor welding tab 49 includes a welding region 53 that is unobstructed from view. The welding region 53 may be welded or otherwise adhered to, for example, a terminal end of an electrochemical cell disposed underneath the bus bar carrier 32.

Figure 6:
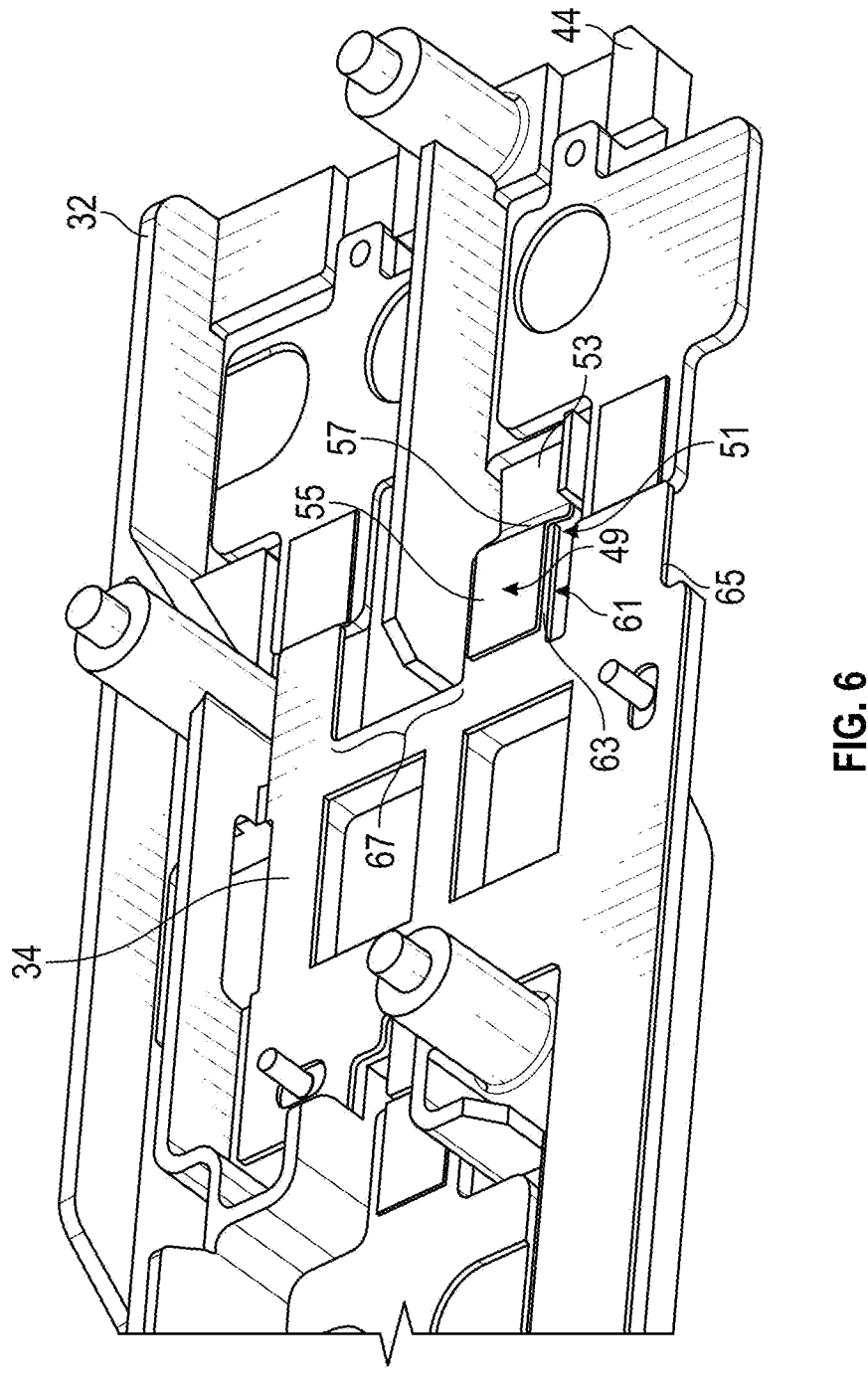
FIG. 6 is a perspective view of a portion of the bus bar carrier and flex circuit of FIG. 4.
Figure 7:
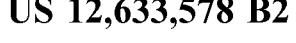
FIG. 7 is a perspective view of a portion of the bus bar carrier of FIG. 4.

FIGS. 6 and 7 are perspective views of a portion of the bus bar carrier 32 and flex circuit 34 of FIG. 4. For example, FIG. 6 is an overhead perspective view of the portion of the bus bar carrier 32 and the flex circuit 34, and FIG. 7 is a bottom perspective view of the portion of the bus bar carrier 32 and the flex circuit 34. In FIG. 6, the flex circuit 34 is illustrated as disposed on the upper side 44 of the bus bar carrier 32. The bus bar carrier 32 includes the window 51 through which the temperature sensor welding tab 49 extends. As shown in FIG. 6, the flex circuit 54 includes a notch 61 between two adjacent extensions 63, 65 of the flex circuit 54, where the temperature sensor welding tab 49 is disposed on the first extension 63 of the two extensions 63, 65. A notch 67 may also be disposed on an opposing side of the first extension 63. That is, the first extension 63 may be defined by the two notches 61, 67, and may include a rectangular shape or other suitable shape.

By disposing the temperature sensor welding tab 49 on the first extension 63, the first extension 63 may flex downwardly when the temperature sensor welding tab 49 is welded or otherwise adhered to the terminal end of the electrochemical cell. Thus, as set forth above, the temperature sensor welding tab 49 is reliably secured to the flex circuit 34. For example, as shown, the temperature sensor welding tab 49 includes a circuit engagement region 55, the welding region 53, and a transverse region 57 extending transversely between the circuit engagement region 55 and the welding region 53. That is, in the illustrated construction the temperature sensor welding tab 49 includes a bent plate, where the transverse region 57 is bent relative to the circuit engagement region 55, and the welding region 53 is bent relative to the transverse region 57. In other words, the transverse region 57 extends at a non-right angle relative to the circuit engagement region 55 and the welding region 53 to enable passage of the temperature sensor welding tab 49 from the flex circuit 34 on the upper side 44 of the bus bar carrier 32, through the window 51, and adjacent the underside 46 (see FIG. 7) of the bus bar carrier 32. Further, the bend of the temperature sensor welding tab 49 (e.g., between the transverse region 57 and the circuit engagement region 55, and between the transverse region 57 and the welding region 53) enforces a gap between the terminal end of the electrochemical cell and other components (e.g., thermistors) of, or on, the flex circuit 34.

FIG. 7, the temperature sensor welding tab 49 is illustrated as extending through the window 51, and being disposed adjacent the underside 44 of the bus bar carrier 32. That is, the welding region 53 is disposed adjacent the underside 44 of the bus bar carrier 32, and may be configured to be welded to the terminal end of an electrochemical cell. Further, in FIG. 7, thermistors 60 are disposed on the flex circuit 34 adjacent to the temperature sensor welding tab 49. For example, the thermistors 60 are disposed on an underside 70 of the first extension 65 of the flex circuit 34. The temperature sensor welding tab 49 may be used, via the coupling (e.g., weld) to the terminal end of the electrochemical cell, to bring the thermistors 60 in close proximity to the terminal end of the electrochemical cell. For example, when the temperature sensor welding tab 49 is coupled to the terminal end of the electrochemical cell, the connection may cause the first extension 63 of the flex circuit 34 to be pulled downwardly, and the thermistors 60 may be disposed on the underside 70 of the first extension 63 of the flex circuit 34. Thus, the thermistors 60 may be pulled toward, or held in close proximity to, the terminal end of the electrochemical cell via the coupling of the temperature sensor welding tab 49 to the terminal end of the electrochemical cell.

In some constructions, the thermistors 60 may be decoupled from the temperature sensor welding tab 49, but disposed in close proximity to the temperature sensor welding tab 49 (i.e., on the underside 70 of the first extension 63 of the flex circuit 34) to enable the above-described effects. In other construction, the thermistors 60 may be electrically coupled to the temperature sensor welding tab 49. Further, the thermistors 60 may be electrically coupled to electrical conductors (e.g., traces) encapsulated by the polyimide material of the flex circuit 34, and/or running along an underside of the flex circuit 34 between the flex circuit 34 and the bus bar carrier 32. The electrical conductors may then couple to electrical contacts 50 (see FIGS. 4 and 5), which may be coupled to a processor or other feature of a printed circuit board or battery module control and/or monitoring assembly.

Figure 8:
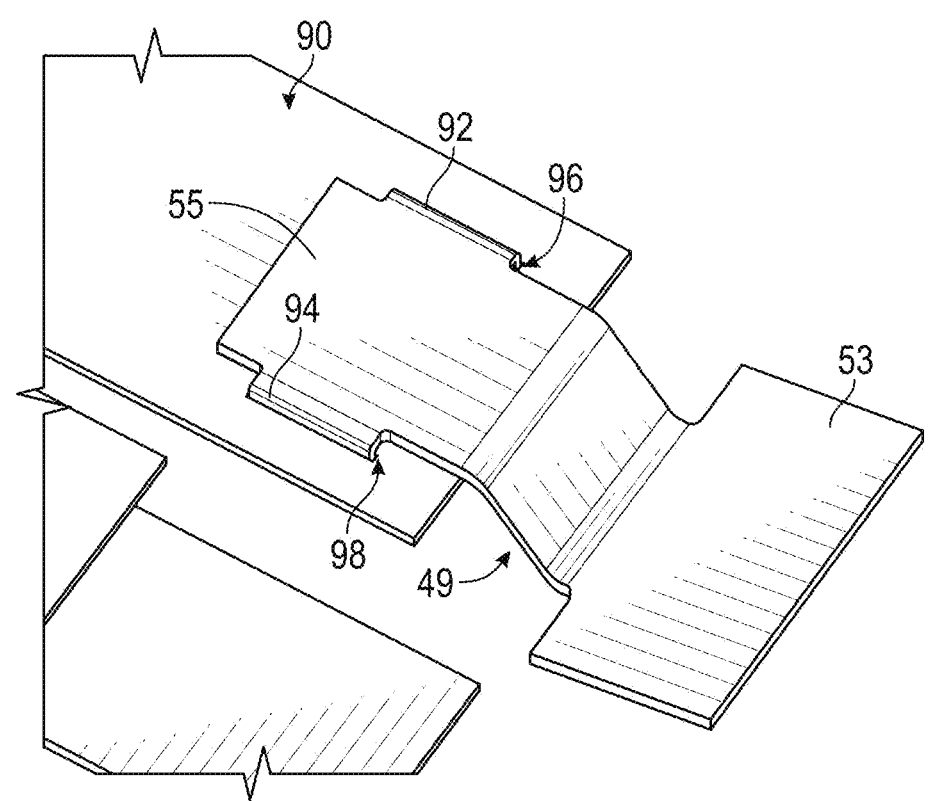
FIG. 8 is an expanded top perspective view of a temperature sensor welding tab coupled to the flex circuit of another bus bar carrier.
Figure 9:
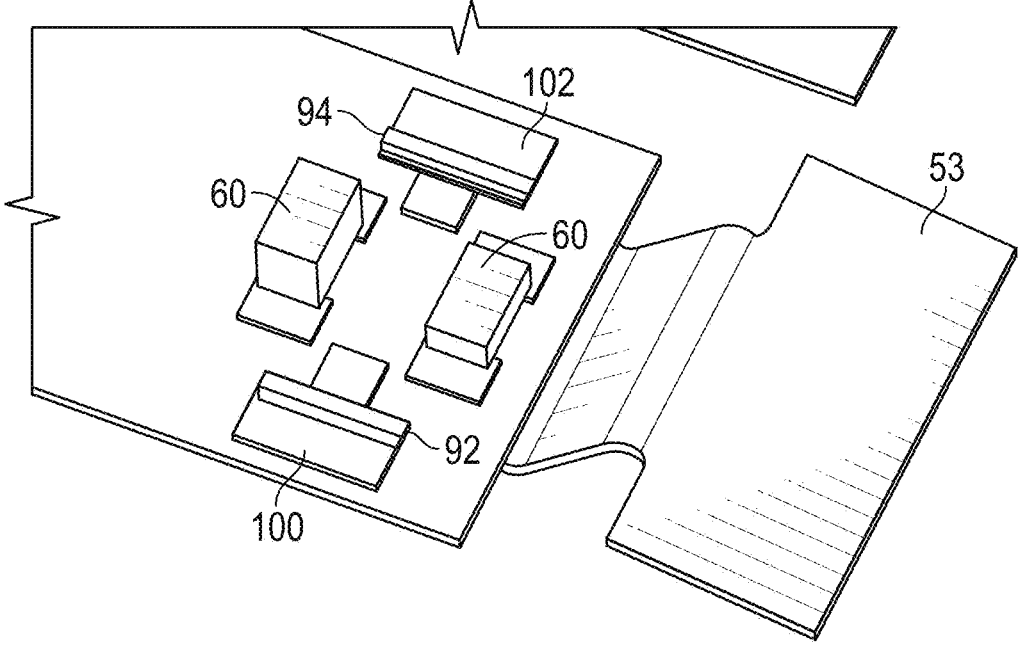
FIG. 9 is an expanded underside perspective view of the temperature sensor welding tab of FIG. 8 coupled to the flex circuit.

The manner in which a temperature sensor welding tab 49 may be coupled to the flex circuit 34 may be further appreciated with reference to FIGS. 8 and 9, which depict expanded views of one of a temperature sensor welding tabs 49 in relation to the flex circuit 34. In particular, FIG. 8 depicts an expanded perspective view of an upper side 90 of the flex circuit 34 (i.e., a side that faces away from the electrochemical cells 38). In the illustrated construction, the circuit engagement region 55 is disposed against the upper side 90 of the flex circuit 34. The temperature sensor welding tab 49 includes a first tab 92 and a second tab 94 that extend from the circuit engagement region 55, for example from opposite sides of the circuit engagement region 55. That is, the first tab 92 and the second tab 94 may protrude in opposite directions from the circuit engagement region 55. The first tab 92 and the second tab 94 are also angled with respect to the plane of the circuit engagement region 55 and the flex circuit 34. That is, the first tab 92 and the second tab 94 each protrude in a first direction away from the circuit engagement region 55, and then protrude in a second, crosswise direction with respect to the plane of the circuit engagement region 55 and the plane of the flex circuit 34. This second, crosswise direction of extension may be produced by a bend, curvature, etc., of the first tab 92 and the second tab 94.

The bends of the first tab 92 and the second tab 94 allow them to protrude through the flex circuit 34 at a first via 96 and a second via 98, respectively. The first tab 92 and the second tab 94 may have any suitable geometry and any suitable dimension, provided that at least some of the techniques presently described for securement with the flex circuit 34 can be performed.

The first via 96 and the second via 98 may have any suitable shape and size to accommodate protrusion of the first tab 92 and the second tab 94 through the flex circuit 34 from the upper side 90 to the underside 70, as shown in FIG. 9. In accordance with certain constructions, the first via 96 and the second via 98 may have a perimeter shape and size that is just slightly larger than the cross-sectional size of the first tab 92 and the second tab 94. For example, the first via 96 and the second via 98 may be sized to allow a robotic placement system to position the flex circuit 34 atop the temperature sensor welding tab 49 in a manner that allows the first tab 92 and the second tab 94 to extend through the flex circuit 34, without additional operations.

As shown in FIG. 9, the first tab 92 and the second tab 94 may be secured to the flex circuit 34 using a first solder pad 100 and a second solder pad 102, respectively. In particular, a paste containing solder may be positioned on the flex circuit 34. Once the flex circuit 34 is placed atop the temperature sensor welding tab 49 causing the first and second tabs 92, 94 to protrude through the flex circuit 34, the paste is heated by an amount sufficient to cause the solder to flow. Once the solder cools, the first and second tabs 92, 94 are secured to the flex circuit 34 by the solder. Such a process may be referred to as a reflow process of soldering. In this respect, the reflow process is used to secure the temperature sensor welding tab 49 to the flex circuit 34.

In certain construction, the reflow process may be performed in a manner that secures several features to the flex circuit 34 at once. For example, referring to the construction illustrated in FIG. 9, the reflow process may be used to secure the first and second tabs 92, 94, the temperature sensor 60 (a thermistor) and a capacitor 104 to the flex circuit 34. Once such features are secured to the flex circuit 34, the temperature sensor welding tab 49 may be considered ready for attachment to one of the electrochemical cells 38. Attachment of features in this order may facilitate assembly and manufacturing. However, the present disclosure is not necessarily limited to this order of operations.

Figure 10:
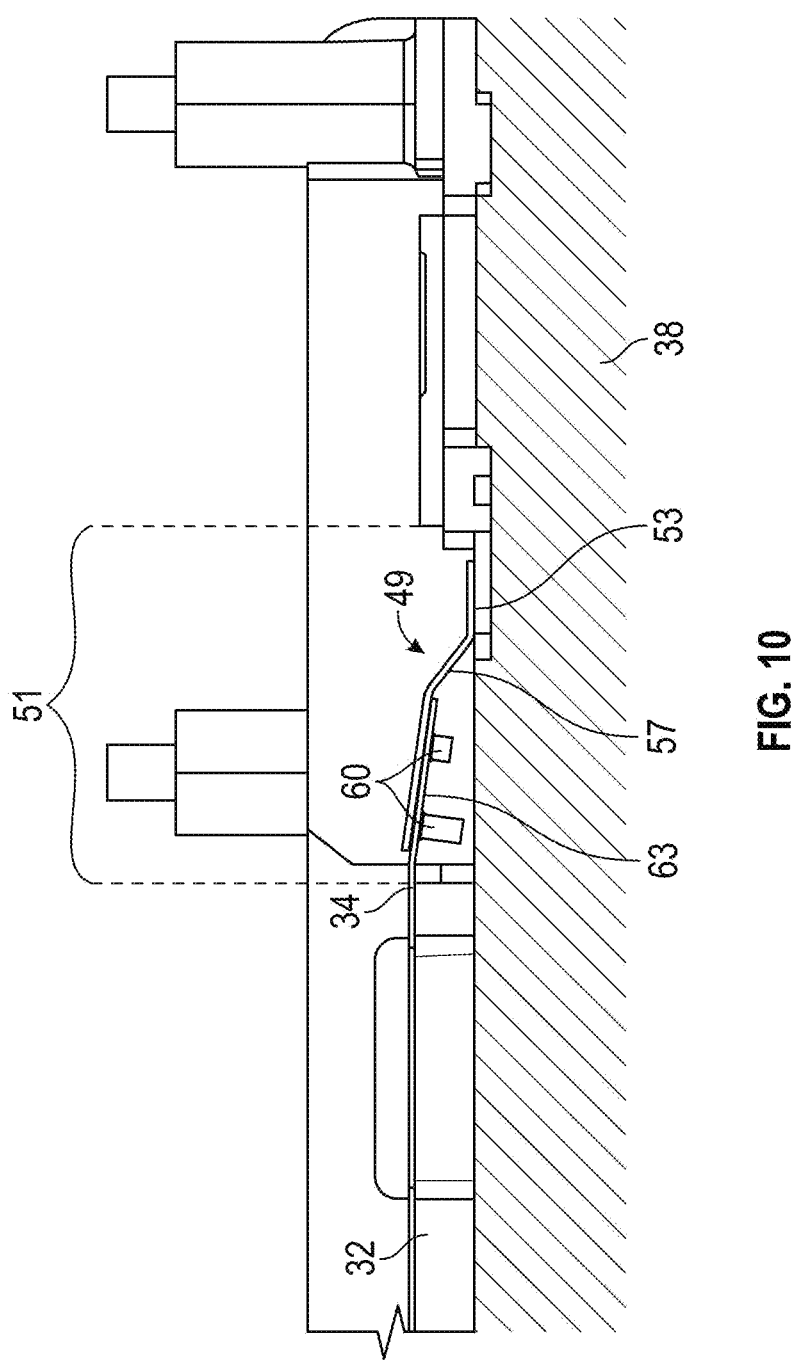
FIG. 10 is a schematic cross-sectional side view of a coupling between a terminal end of an electrochemical cell and a temperature sensor welding tab of a flex circuit disposed on a bus bar carrier, for use in the battery module of FIG. 3.

FIG. 10 is a schematic cross-sectional side view of a construction of a coupling between the terminal end 43 of an electrochemical cell 38 and the temperature sensor welding tab 49 of the present disclosure. As previously described, the temperature sensor welding tab 49 may include the circuit engagement region 55, the welding region 53, and the transverse region 57 extending between the circuit engagement region 55 and the welding region 53. The transverse region 57 may be bent to form an angle with the welding region 53, and the circuit engagement region 55 may be bent relative to the transverse region 57 to form another angle with the transverse region. By including the transverse region 57 extending at angles relative to the welding region 53 and the circuit engagement region 55, the welding region 53 may fall flat on the terminal end 43 of the electrochemical cell 38. The welding region 53 may be coupled to the terminal end 43 of the electrochemical cell 38 such that at least the transverse region 57 of the temperature sensor welding tab 49 is disposed in the window 51 of the bus bar carrier 32. As shown, a portion (e.g., the first segment 63) of the polyimide material of the flex circuit 34 may also extend into (e.g., overlap with) the window 51 of the bus bar carrier 32, and the thermistors 60 may be disposed on the first segment 63 of the polyimide material of the flex circuit 34. Thus, the temperature sensor welding tab 49, when coupled to the terminal end 43 of the electrochemical cell 38, may cause the first segment 63 of the polyimide material of the flex circuit 34, and the thermistors 60 coupled to the first segment 63, to be drawn toward the terminal end 43 of the electrochemical cell 38. However, in other construction, the welding region 53 may fall flat against the terminal end 43 of the electrochemical cell 38 without substantial bending of the first segment 63 of the polyimide material of the flex circuit 34.

Further, the bend of the temperature sensor welding tab 49 (e.g., between the transverse region 57 and the circuit engagement region 55, and between the transverse region 57 and the welding region 53) enforces a gap between the terminal end 43 of the electrochemical cell 38 and other components (e.g., thermistors 60) of, or on, the flex circuit 34. The gap blocks an interference of the electrochemical cell 38 upon the thermistors 60 and/or other components.

The disclosed features of the bus bar carrier 32, the flex circuit 34, the temperature sensor welding tabs 49, and the thermistors 60 may enable improved assembly of the battery module, may reduce a cost of the battery module, and may improve temperature measurements determined by the battery module.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

What is claimed is:

1. A bus bar assembly for a battery module having a plurality of electrochemical cells, the bus bar assembly comprising:
   a bus bar carrier configured to receive bus bars to interface with terminals of the plurality of electrochemical cells, the bus bar carrier having a window extending through a thickness of the bus bar carrier;
   a flex circuit disposed on the bus bar carrier, the flex circuit including a flexible extension configured to extend through at least a portion of the window;
   a temperature sensor welding tab comprising a circuit engagement region secured to the flexible extension of the flex circuit, a welding region to be welded to an end of an electrochemical cell, and a transverse region extending transversely between the circuit engagement region and the welding region, wherein the transverse region extends through the window; and
   wherein the circuit engagement region of the temperature sensor welding tab comprises a first tab and a second tab each protruding in a first direction away from the circuit engagement region, each of the first and second tabs comprising a bend that causes the first and second tabs to protrude in a second direction through vias of the flexible extension of the flex circuit.

2. The bus bar assembly of claim 1, wherein the flexible extension of the flex circuit is provided between a first notch and a second notch, wherein the temperature sensor welding tab is disposed on the flexible extension via a solder pad.

3. The bus bar assembly of claim 1, further comprising a temperature sensor, and wherein the flex circuit includes a conductive trace coupled to the temperature sensor.

4. The bus bar assembly of claim 1, wherein the temperature sensor welding tab includes a bent plate.

5. The bus bar assembly of claim 1, wherein the transverse region is bent relative to the circuit engagement region, and the welding region is bent relative to the transverse region.

6. The bus bar assembly of claim 1, wherein the transverse region extends at a non-right angle relative to the circuit engagement region, and the welding region extends at a non-right angle relative to the transverse region.

7. The bus bar assembly of one of claim 4, wherein the temperature sensor welding tab extends from the flex circuit on an upper side of the bus bar carrier through the window and adjacent an underside of the bus bar carrier.

8. The bus bar assembly of one of claim 1, further comprising a temperature sensor, wherein the flex circuit includes a conductive trace coupled to the temperature sensor, and the transverse region results in a gap between the terminal end of the electrochemical cell and the temperature sensor.

9. The bus bar assembly of claim 8, wherein the temperature sensor includes thermistors disposed on the flex circuit adjacent to the temperature sensor welding tab.

10. The bus bar assembly of claim 9, wherein the thermistors are disposed on an underside of a flexible extension of the flex circuit to bring the thermistors in close proximity to the terminal end of the electrochemical cell.

11. The bus bar assembly of one of claim 8, wherein the flex circuit includes an electrical contact coupled to the conductive trace, wherein the conductive trace is encapsulated by the flex circuit, and wherein the conductive trace electrically connects the temperature sensor to the electrical contact.

12. A battery module comprising:

a housing; and a plurality of electrochemical cells disposed in the housing, the plurality of electrochemical cells including an electrochemical cell having a terminal end;

the bus bar assembly of claim 1, wherein the temperature sensor welding tab is welded to the terminal end of the electrochemical cell.

13. The battery module of claim 12, wherein the circuit engagement region of the temperature sensor welding tab comprises a first tab and a second tab protruding in a first direction away from the circuit engagement region, each of the first and second tabs comprising a bend that causes the first and second tabs to protrude in a second direction through vias of the flex circuit.

14. A method of making a battery module including a housing, the method comprising:

placing a plurality of electrochemical cells in the housing, the plurality of electrochemical cells including an electrochemical cell having a terminal end;

providing a bus bar assembly including a bus bar carrier and a flex circuit disposed on the bus bar carrier, the flex circuit including a flexible extension configured to extend through a window of the bus bar carrier;

soldering a circuit engagement region of a temperature sensor welding tab to the flexible extension of the flex circuit;

bending a transverse region of the temperature sensor welding tab through the window of the bus bar carrier;

placing the bus bar assembly adjacent to the plurality of electrochemical cells;

flexing the flexible extension toward the electrochemical cells such that a temperature sensor of the flex circuit is in close proximity to the terminal end of the electrochemical cell; and welding a welding region of the temperature sensor welding tab to the terminal end of the electrochemical cell.

15. The method of claim 14, wherein the temperature sensor welding tab extends from the flex circuit on an upper side of the bus bar carrier through the window and adjacent an underside of the bus bar carrier.

16. A battery module comprising:

a housing;

a plurality of electrochemical cells disposed in the housing, the plurality of electrochemical cells including an electrochemical cell having a terminal end;

a bus bar carrier configured to receive bus bars to interface with terminals of the plurality of electrochemical cells, the bus bar carrier having a window extending through a thickness of the bus bar carrier;

a flex circuit disposed on the bus bar carrier, the flex circuit including an electrical contact, a flexible extension configured to extend through at least a portion of the window, and a conductive trace extending from the flexible extension to the electrical contact;

a temperature sensor welding tab comprising a circuit engagement region secured to the flexible extension of the flex circuit via a tab and a solder pad, a welding region welded to the terminal end of the electrochemical cell, and a transverse region extending transversely between the circuit engagement region and the welding region, and the transverse region extending through the window; and a temperature sensor secured to the flexible extension and connected to the conductive trace.

17. The battery module of claim 16, wherein the temperature sensor welding tab includes a bent plate having a first bend and a second bend, the transverse region extending between the first bend and the second bend.

18. The battery module of claim 16, wherein the transverse region is bent relative to the circuit engagement region, and the welding region is bent relative to the transverse region.

19. The battery module of one of claim 16, wherein the transverse region extends at a non-right angle relative to the circuit engagement region, and the welding region extends at a non-right angle relative to the transverse region.

20. The battery module of one of claim 16, wherein the temperature sensor welding tab extends from the flex circuit on an upper side of the bus bar carrier through the window and adjacent an underside of the bus bar carrier, wherein the temperature sensor includes thermistors disposed on the flex circuit adjacent to the temperature sensor welding tab, and wherein the thermistors are disposed on an underside of the flexible extension of the flex circuit to bring the thermistors in close proximity to the terminal end of the electrochemical cell.

* * * * *